July 6, 1948.  T. W. VICKERS  2,444,886
SCREW AND NUT ACTUATING MECHANISM
Filed April 9, 1945  3 Sheets-Sheet 1

INVENTOR.
THEODORE W. VICKERS
BY
Frederick Diehl
ATTORNEY

July 6, 1948.  T. W. VICKERS  2,444,886
SCREW AND NUT ACTUATING MECHANISM
Filed April 9, 1945  3 Sheets-Sheet 2
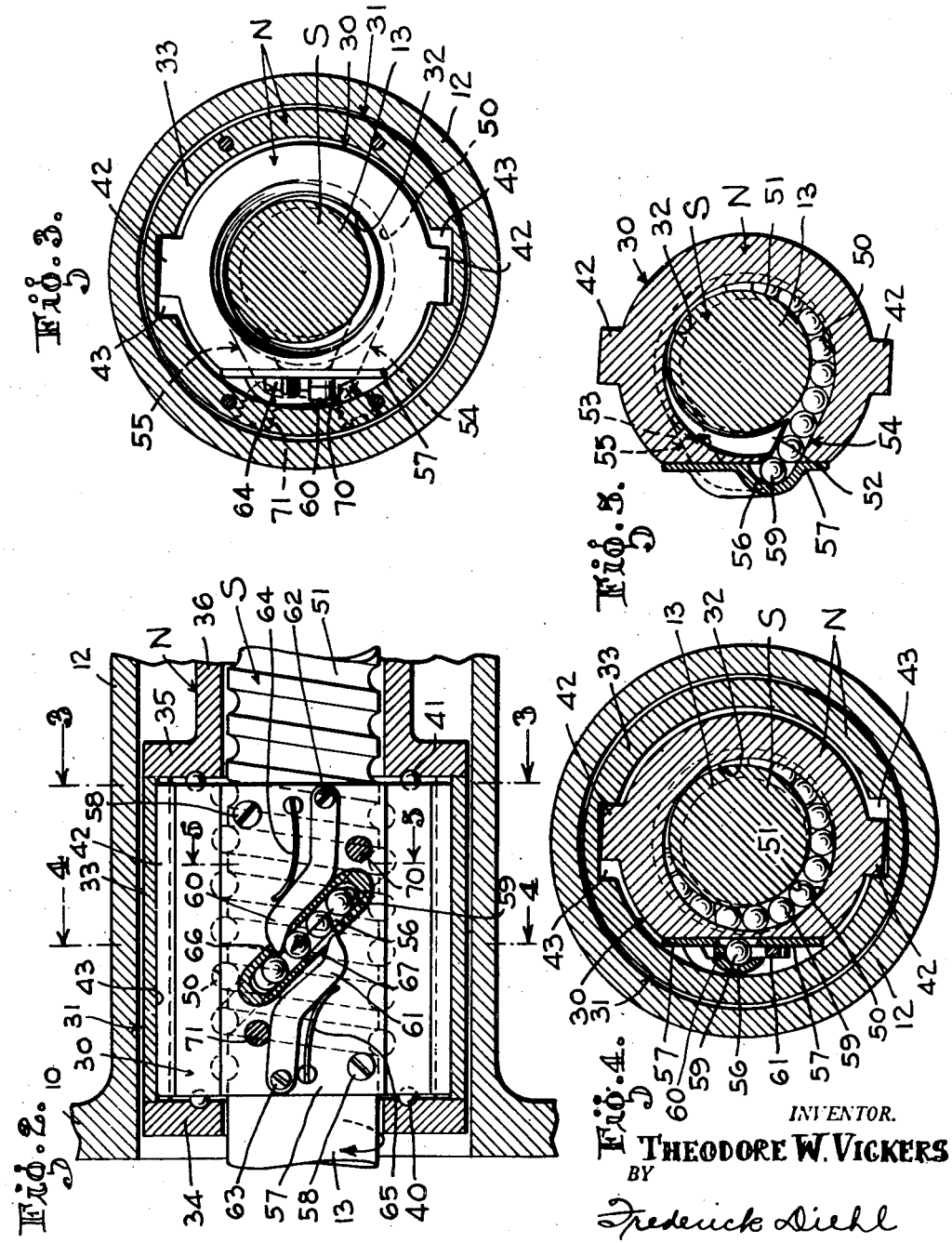
INVENTOR.
THEODORE W. VICKERS
BY
Frederick Diehl
ATTORNEY

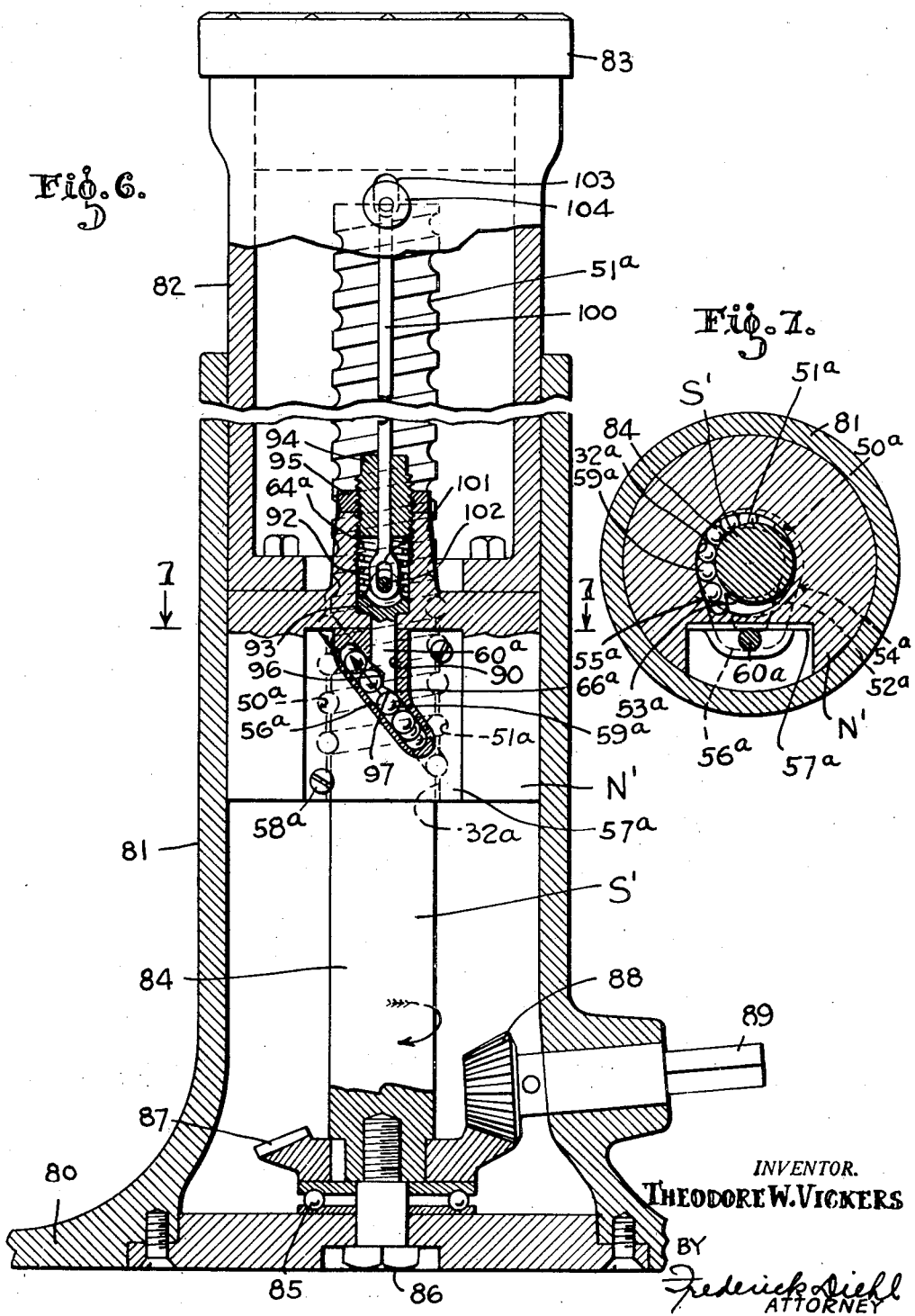

Patented July 6, 1948

2,444,886

UNITED STATES PATENT OFFICE 2,444,886

SCREW AND NUT ACTUATING MECHANISM

Theodore W. Vickers, Los Angeles, Calif.

Application April 9, 1945, Serial No. 587,246

12 Claims. (Cl. 74—459)

This invention relates generally to mechanical movements and more particularly to actuating mechanisms such as screw and nut operated mechanisms employed in aircraft actuators, lifting jacks, vises, presses and other screw devices by which an applied force is greatly multiplied at a load.

Although actuating mechanisms such as the screw and nut, and worm and gear have a high mechanical advantage, the sliding friction between the threads or teeth of the screw and those of the nut or gear is very great, thus making such mechanical movements extremely inefficient because of the relatively large frictional loss. To reduce this friction to a relatively small amount, a mechanism known as the ball bearing screw nut has been developed, and employs a series of balls in place of screw threads, which balls are forced to roll in mating helical grooves or races in the screw and nut, by load pressure imposed thereon when working, and are by-passed from the grooves through the nut and returned to the grooves so as to circulate freely in one direction or the other according as relative axial movement of the screw and nut in one direction or the other is effected under load. This ball bearing screw nut mechanism eliminates the thread-sliding friction by substituting therefor the rolling friction of the balls, thus vastly increasing the efficiency of the mechanism while retaining its mechanical advantage.

However, this ball bearing nut mechanism has the disadvantage that upon removal of the driving force therefrom, the load will act through the balls to drive the mechanism in a retrograde direction because of the lack of friction between the screw and nut. To prevent such "overhaul" of the mechanism, a holding force must be continuously applied thereto, or a braking device provided in order to support the load.

The primary object of this invention is to provide a ball bearing screw nut mechanism or similar actuating mechanism embodying simple and positive means by which the driving of such mechanism in a retrograde direction by the load is prevented by interposing sufficient sliding friction between the screw and nut for the load to be supported without the use of a holding force, braking, or other extraneous device.

More specifically, it is an object of this invention to provide a ball bearing screw nut or similar actuating mechanism embodying means by which the retrograde driving of such mechanism by the load is prevented by stopping the relatively frictionless rolling movement of the balls in the direction wherein they are caused to feed through the screw and nut grooves by pressure of the load, so that in order for the load to drive the mechanism, the balls will be forced to slide rather than roll in the grooves, with the resulting greatly increased friction between the screw and nut being sufficient to support the load.

It is a further object of this invention to provide a mechanism of the above described character, which, in its application to an aircraft actuator or other device subjected to a load in two opposed directions, will be automatically operable to obstruct rolling movement of the balls in the grooves of the screw and nut in one direction or the other according as the load is imposed upon the mechanism to drive same in one direction or the other, so that the sliding friction thus provided between the screw and nut will support the load, all while enabling the driving force to actuate the mechanism in either direction in opposition to the load with the balls free to roll and thus reduce the friction between the screw and nut for high efficiency operation of the mechanism.

It is a still further object of this invention to provide a control means for a nut and screw or similar actuating mechanism by which a restricted circulation may be effected under the pressure of a load in excess of a predetermined maximum load immovably supported by the mechanism, so as to compensate for sudden or heavy load shocks which might otherwise impose damaging crushing stresses on the balls. Also, the load can be rendered free to drive the mechanism and thus move at a predetermined rate upon removal of the driving force from the mechanism, all to the end of greatly extending the range of use of the mechanism.

With these and other objects in view, the invention resides in the combinations, arrangements and functional relationships of elements as set forth in the following specification and particularly pointed out in the appended claims.

In the accompanying drawings,

Figure 2 is an enlarged fragmentary longitudinal sectional view showing a portion of the aircraft actuator with the mechanism embodying this invention occupying another active position;

Figure 1:
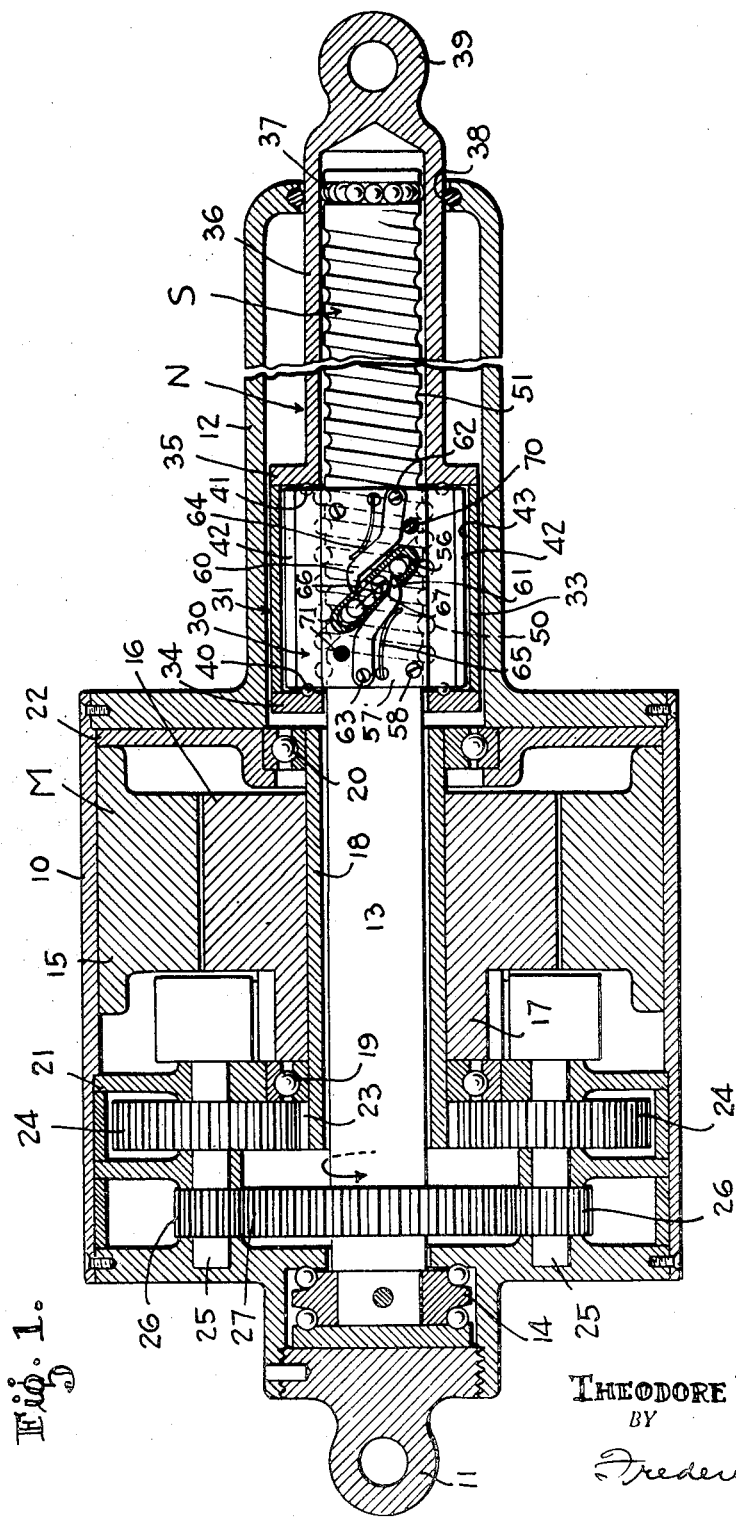
Figure 1 is a longitudinal sectional view of an aircraft actuator, with one form of mechanism embodying this invention, applied thereto and occupying one active position.

Figures 3, 4 and 5 are transverse sectional views taken, respectively, on the lines 3—3, 4—4 and 5—5 of Figure 2;

Figure 6 is a vertical longitudinal sectional view of a lifting jack with another form of mechanism embodying this invention applied thereto; and Figure 7 is a transverse sectional view taken on the line 7—7 of Figure 6.

Referring specifically to the drawings, and particularly to Figures 1 to 5 inclusive, this form of the invention is shown for the purpose of illustration, embodied in an aircraft actuator comprising a cylindrical casing 10 having at one end an attaching eye 11, and provided at its other end with a tubular extension 12 in which is slidably mounted a nut element N receiving a screw element S.

The screw element S is in the form of a shaft 13, one end of which is journaled in the casing 10 by a double thrust bearing 14 which confines the shaft against axial displacement. The shaft 13 is adapted to be driven in one direction or the other by a reversible electric motor M whose field 15 is supported in the casing, and whose armature 16 and commutator 17 are fixed on a tubular shaft 18 freely receiving the shaft 10 in co-axial relation thereto, and journaled in bearings 19 and 20 supported by plates 21 and 22 in the casing.

At one end the shaft 18 is provided with a driving gear 23 meshing with larger gears 24 fixed to idler shafts 25 journaled in the casing. Relatively smaller gears 26 are fixed to the idler shafts 25 and mesh with a large gear 27 fixed to the shaft 13, to the end of providing a speed-reducing gear train between the armature shaft 18 and the screw element S to drive the latter at a slow speed relative to that of the motor M.

The nut element N is composed of two sections 30 and 31, the section 30 being in the form of a cylindrical body having a longitudinal bore 32 of a slightly larger diameter than that of the shaft 13. The section 31 is composed of a cylindrical barrel 33 freely receiving the section 30, and closed at its ends by heads 34 and 35, the latter of which has a tubular extension 36 receiving the shaft 13, whose outer end is journaled therein by a bearing 37. The outer end of the extension 36 projects through a sealed opening 38 in the end of the casing extension 12, and is provided with an attaching eye 39 in opposed and alined relation to the attaching eye 11 of the casing.

The section 30 is mounted between the heads 34 and 35 by anti-friction bearings 40 and 41 for axial movement with the section 31 as a single unit, and is provided with keys 42 co-acting with keyways 43 in the barrel 33 to provide a lost motion rotational driving connection (Figure 3) between the sections 30 and 31 for a purpose to be later described.

The wall of the bore 32 in the section 30 of the nut element N is provided with a helical groove 50 co-acting with a mating helical groove 51 in that portion of the screw element S which is adapted to be traveled upon by the section 30. The ends of the groove 50 are closed off from the ends of the section 30 by two oppositely positioned ring segments 52 and 53 seating tightly in the groove so as to provide a plurality of intervening convolutions. The ends of these convolutions communicate at the ring segments 52 and 53 with tangential ball conduits 54 and 55 in the section 30, connected by an obliquely disposed ball conduit 56 formed in plate 57 secured by screws 58 on a flat face of the section 30, all to the end of providing a continuous ball race between the elements S and N which is filled with a series of hardened steel balls 59 providing an operative connection between the elements which functions in the manner of a screw thread to relatively feed the elements axially in response to rotation of the screw element S.

When the screw element S is being driven in one direction or the other by the electric motor M in opposition to a load tending to separate the attaching eyes 11 and 39, or move them closer together, the series of balls are forced to roll and thus circulate through the aforesaid ball race in one direction or the other. The high mechanical advantage of the screw and nut is thus obtained with a minimum frictional loss, as the balls provide relatively small rolling friction between the screw and nut elements, rather than the relatively large sliding friction present with the use of screw threads. However, this ball bearing screw nut mechanism has the disadvantage that the load being moved will as readily drive the mechanism in a retrograde direction by overcoming the slight rolling friction of the balls, upon removal of the driving force from the mechanism, thus rendering same incapable of immovably supporting the load in the position to which it is moved. It is the present practice to provide relatively complicated braking devices or other extraneous holding means to prevent retrograde rotation of the screw element S by the nut element N under the weight of the load, all of which adds materially to the cost and upkeep of the mechanism.

To overcome the disadvantage, this invention proposes a simple automatically operable means preferably co-acting directly with the balls 59 and comprising in one embodiment, pawls or dogs 60 and 61 pivotally mounted by screws 62 and 63 on the plate 57 at opposite sides of the ball conduit 56, and urged by springs 64 and 65 to project their bills through slots 66 and 67 in the ball conduit to occupy an active position wherein the bills of the pawls are disposed in the path of movement of the balls through the conduit. The pawls are disposed in opposed relationship so that one pawl prevents circulation of the balls in one direction, whereas the other ball prevents circulation of the balls in the other direction, it being understood that the two pawls are required in the use of the invention on an aircraft actuator which must move and support a load imposed thereon sometimes in one direction, and at other times in the opposite direction.

Co-acting with the respective pawls 60 and 61 and with the lost motion rotational driving connection provided between the sections 30 and 31 of the nut element N by the keys 42 and keyways 43, are actuating lugs in the form of pins 70 and 71 projecting from the barrel 33 of the section 31 for actuation of the respective pawls to automatically move one or the other to an inactive position clear of the path of movement of the balls through the ball race, according as the section 30 tends to rotate relative to the section 31 in one direction or the other in the operation of the invention which is as follows:

With one of the eyes 11 and 39 anchored to a fixed support and the other to a load to be moved in a direction separating the eyes, the motor M is supplied with current from a suitable source to drive the screw element S in the direction of the arrow in Figure 1, thus tending to cause the balls 59 to circulate through the ball race in the direction of the arrow. It will be noted that under this condition, the pawl 60 has been moved by the pin 70 to its inactive position, whereas the pawl 61 is freed of its pin 71 so as to be yieldingly urged by its spring 65 to its active position, all during the initial slight rotation of the section 30 relative to the section 31 permitted by the lost motion driving connection between the keys 42 and keyways 43, following which the nut element N will be moved to the right in Figure 1 as the balls freely click past the bill of the active pawl 61 in the direction of the arrow, under the pressure imposed by the driving force on those balls in the grooves 50 and 51. Therefore, it will be evident that the high mechanical advantage of the screw and nut will be obtained, with an attending high efficiency due to the negligible rolling friction provided by the balls between the screw and nut elements.

However, upon removing the driving force from the screw element S, the pressure imposed on the balls in the grooves 50 and 51 by the resistance of the load, will be reversed, thus tending to circulate the balls in the direction reverse to the arrow, which circulation is positively prevented by the active pawl 61. As the tendency of the nut element N to rotate the screw element S in a retrograde direction, is resisted by the large sliding friction of the now non-circulating balls between the elements, rather than the small rolling friction present when the driving force was applied, the load will be supported in the position to which it has been moved.

Assuming that the load condition is reversed and acts in the opposite direction by tending to separate the eyes 11 and 39, the pawls 60 and 61 will be reversed automatically to the positions shown in Figure 2 by the slight initial reverse rotation of the element 30 permitted by the lost motion driving connection between the keys 42 and keyways 43, so that in response to driving the nut element N in the direction opposite to the arrow in Figure 1 to feed the nut element towards the left, the balls 59 will circulate in the direction of the arrow in Figure 2 by freely clicking past the now active pawl 60. Upon removing the driving force from the screw element, the reverse circulation of the balls by the load will be prevented by the pawl 60 with the advantages above described.

It will be noted that the bills of the pawls 60 and 61 can be so shaped as to permit a restricted circulation of the balls by sudden or heavy loads in excess of a predetermined maximum load, so as to prevent damaging crushing stresses from being imposed on the balls by such excessive loads, all without adversely affecting the functioning of the balls in co-action with the pawls to support loads up to the predetermined maximum. Furthermore, springs of different strengths could be utilized for this purpose in order to compensate for excessive load shocks. Considering that surface of the pawl being engaged by the balls, as an inclined plane or a cam, it will be appreciated that by reducing to a predetermined inclined plane, the angle of the surface of the active pawl which is being engaged by the balls to stop their circulation by the load, a camming action upon such surface by the balls will be effected, so as to tend to move the pawl to inactive position against the pawl spring, which latter, under such condition is made of such strength to ineffectively oppose movement of the pawl to inactive position by the balls, and thus permit them to continue to roll but not so freely as in the direction caused by the driving force. This, in effect, is a brake placed upon the flow of the balls through the bypass, and thus a brake on the "overhaul" of the screw nut.

It will be clear from the foregoing description that regardless of whether the screw element S is being driven in one direction or the other in opposition to a load, the negligible rolling friction of the balls 59 will be utilized, and that upon removal of the driving force, one pawl or the other will automatically co-act with the balls to substitute the sliding friction for the rolling friction thereof in order to support the load.

Reference will now be had to Figures 6 and 7 in which is illustrated a second embodiment of this invention which can be applied to the lifting jack shown, or to a vise, press, or other device in which the load always acts in one direction.

The lifting jack comprises a base 80 having a tubular standard 81 in which is vertically slidable a plunger 82 having a load-engaging head 83, and being secured to a nut element N' co-acting with a screw element S'. The screw element is in the form of a cylindrical shaft 84 rotatably mounted in the standard by a thrust bearing 85 and a central retaining screw 86. Fixed to the screw element is a relatively large gear 87 with which meshes a pinion gear 88 journaled in the standard 81 and having a non-circular shank 89 to which a suitable crank handle (not shown) is adapted to be attached to drive the screw element through the gears.

The longitudinal bore 32a of the nut element N' is of a slightly larger diameter than that of the screw element S', and is provided with a helical groove 50a co-acting with a mating helical groove 51a in the portion of the screw element which is adapted to be traveled upon by the nut element. The ends of the groove 50a are closed off from the ends of the nut element by two oppositely positioned ring segments 52a and 53a seating tightly in the groove so as to provide a plurality of intervening convolutions. The ends of these convolutions communicate at the ring segments with tangential ball conduits 54a and 55a in the nut element N', connected by an obliquely disposed ball conduit 56a formed in a plate 57a secured by screws 58a on a flat face of the nut element, all to the end of providing a continuous ball race between the elements S' and N' which is filled with balls 59a providing an operative connection between the elements in the manner previously described.

A single dog or pawl 60a is reciprocably mounted in a bore 90 in the nut element N', and is urged to the active position shown in Figure 6, by a coil spring 64a working in an enlarged bore 92 of the nut element, and bearing at one end against the head 93 of the pawl, and at its other end against an adjustable pressure screw 94 threaded in the bore 92 and locked in adjusted position by a jam nut 95. Under the action of the spring 64a, the working end of the pawl 60a projects through a slot 66a in the ball conduit 56a into the path of movement of the balls therethrough. The working end of the pawl is provided with a stop shoulder 96 to prevent circulation of the balls in the direction caused by the load, and is provided with a cam surface 97 to permit the balls to freely pass the pawl in the opposite direction caused by the driving force applied to the screw element in opposition to the load, as is indicated by the arrows in Figure 6.

Thus, the plunger 82 will be raised by utilizing the relatively small rolling friction of the freely circulating balls between the screw and nut elements, and will be effectively supported against lowering movement or retrograde driving of the mechanism by the large sliding friction of non-circulating balls.

A release member in the form of a pull rod 100, extends through a longitudinal bore in the screw 94, and has one end provided with a slot 101 receiving a pin 102 carried by the pawl 60a. The other end of the pull rod 100 projects laterally through a slot 103 in the plunger 82, and is provided exteriorly of the plunger with an actuating knob 104. By means of the pull rod, the pawl 60a can be moved to an inactive position so as to permit free circulation of the balls by the load in order to rapidly lower the latter, as is desirable in the case of an automobile jack.

It will be evident that by varying the shape of the stop shoulder 96 so that it presents a less abrupt steeply inclined surface to the balls 59a, and by varying the loading of the spring 64a with the pressure screw 94, restricted circulation of the balls by the load may be effected so as to support a predetermined maximum load, and yet relieve the balls of any damaging crushing stresses by excessive loads. Under this condition, the stop shoulder 96 functions as an inclined cam surface which is acted upon by the balls to force the pawl 60a to inactive position against a predetermined loading of the spring 64a by the screw 94, so that the balls may continue to roll in the direction caused by the load, but less freely than in the opposite direction caused by the driving force.

I claim:

1. In mechanism of the class described, two elements having co-acting helically related grooves; balls in said grooves operatively connecting said elements for relative movement, one by the other; means co-acting with said grooves to provide a continuous circulatory path along which the balls are forced to roll in one direction or the other according as said relative movement of the elements is effected in one direction in opposition to the load, or in the other direction by the load; means co-acting with the balls to prevent circulation thereof in that direction caused by the load, whereby sliding friction of the balls between said elements will be utilized to support the load; and means co-acting with the balls to free them for rolling movement when load-moving force is applied to the elements, so that the rolling friction of the balls between the elements will be present when moving the load.

2. In mechanism of the class described, two elements having co-acting helically related grooves; balls in said grooves operatively connecting said elements for relative movement, one by the other; means co-acting with said grooves to provide a continuous circulatory path along which the balls are forced to roll in one direction or the other according as said relative movement of the elements is effected in one direction in opposition to a load, or in the other direction by the load; a pawl; and means urging said pawl to an active position wherein the pawl will co-act with the balls in preventing their circulation in that direction caused by the load, so as to utilize sliding friction of the balls between the elements in supporting the load.

3. In mechanism of the class described, screw and nut elements having mating helical grooves; balls in said grooves operatively connecting said elements for relative movement, one by the other; means defining a ball conduit in the nut element, co-acting with said grooves to provide a continuous circulatory path along which the balls are forced to roll in one direction or the other according as axial pressure is imposed in one direction or the other in said grooves; a pawl; means mounting said pawl on the nut element for co-action with balls traveling said conduit; and yieldable means urging said pawl to a position wherein the pawl obstructs circulation of the balls in one direction, yet yields to circulation of the balls in the opposite direction.

4. In mechanism of the class described, two elements having co-acting helically related grooves; balls in said grooves operatively connecting said elements for relative movement, one by the other; means co-acting with said grooves to provide a continuous circulatory path along which the balls are forced to roll in one direction or the other according as said relative movement of the elements is effected in one direction in opposition to a load, or in the other direction by the load; means co-acting with the balls to prevent circulation thereof in that direction caused by the load, whereby sliding friction of the balls between said elements will be utilized to support the load; and means by which a restricted circulation of the balls may be effected by loads in excess of a predetermined maximum load, so as to prevent damaging crushing stresses from being imposed on the balls by sudden or relatively heavy load shocks.

5. In mechanism of the class described, two elements having mating helical grooves; balls in said grooves operatively connecting said elements for relative movement, one by the other; means co-acting with said grooves to provide a continuous circulatory path along which the balls are forced to roll in one direction or the other according as relative axial movement of the elements is effected in one direction or the other under load; and two means respectively co-acting with the balls to prevent their circulation in one direction or the other according as the mechanism is subjected to loads in one retrograde direction or the other with respect to forces applied to the elements to drive same in opposition to such loads.

6. In mechanism of the class described, two elements having mating helical grooves; balls in said grooves operatively connecting said elements for relative movement, one by the other; means co-acting with said grooves to provide a continuous circulatory path along which the balls are forced to roll in one direction or the other according as relative axial movement of the elements is effected in one direction or the other under load; two pawls; means urging said pawls to an active position wherein the pawls respectively prevent circulation of the balls in opposite directions; and means for maintaining one pawl in an inactive position while the other pawl is active to obstruct circulation of the balls in the respective direction, so as to permit circulation of the balls in the reverse direction.

7. In mechanism of the class described, screw and nut elements having mating helical grooves; balls in said grooves operatively connecting said elements for relative movement, one by the other; means defining a ball conduit in the nut element, co-acting with said grooves to provide a continuous circulatory path along which the balls are forced to roll in one direction or the other according as said relative movement of the elements is effected in one direction in opposition to a load, or in the other direction by the load; two pawls; means mounting said pawls on the nut element for co-action with balls traveling said conduit; means urging said pawls to an active position wherein they respectively prevent circulation of the balls in opposite directions; and means co-acting with the pawls to maintain one inactive while the other is active, so as to permit circulation of the balls in the direction opposite to that in which circulation of the balls is being prevented by the active pawl.

8. In mechanism of the class described, screw and nut elements, the latter being composed of two sections operatively connected by a lost motion rotational driving connection and for axial movement as a unit; said screw element and one of said sections having mating helical grooves; balls in said grooves operatively connecting said screw element and said one section for relative axial movement of the sections in response to relative rotation of the elements; means co-acting with said grooves to provide a continuous circulatory path along which the balls are forced to roll in one direction or the other according as said axial movement of the elements is effected in one direction or the other under load; two means, one of which co-acts with the balls in preventing circulation thereof in one direction, and the other of which co-acts with the balls to prevent circulation thereof in the opposite direction; and means operable in response to the relative rotation between said sections of the nut element permitted by said lost motion connection therebetween, to move one pawl or the other to an inactive position according as such relative rotation between the elements is effected in one direction or the other.

9. In mechanism of the class described, screw and nut elements, the latter being composed of two sections operatively connected by a lost motion rotational driving connection and for axial movement as a unit; said screw element and one of said sections having mating helical grooves; balls in said grooves operatively connecting said screw element and said one section for relative axial movement of the sections in response to relative rotation of the elements; means co-acting with said grooves to provide a continuous circulatory path along which the balls are forced to roll in one direction or the other according as said axial movement of the elements is effected in one direction or the other under load; two pawls; means urging said pawls to an active position wherein they respectively co-act with the balls in preventing circulation thereof in opposite directions; and means on said other nut section for moving one pawl or the other to an inactive position according as the rotation between the elements permitted by said lost motion connection therebetween is effected in one direction or the other.

10. In mechanism of the class described, two elements having co-acting helically related grooves; balls in said grooves operatively connecting said elements for relative movement, one by the other; means co-acting with said grooves to provide a continuous circulatory path along which the balls are forced to roll in one direction or the other according as said relative movement of the elements is effected in opposition to a load, or in the other direction by the load; a pawl; means urging said pawl to an active position wherein the pawl will co-act with the balls in preventing their circulation in that direction caused by the load, so as to utilize sliding friction of the balls between the elements, in supporting the load; and means by which said pawl can be moved to an inactive position so as to restore the rolling friction of the balls between the elements for retrograde movement thereof by the load.

11. In mechanism of the class described, two elements, one of which is adapted to be driven for co-action with the other in moving a load; a series of balls; means defining a continuous race between said elements receiving said balls to operatively connect the elements for relative movement through the medium of the balls which are forced to circulate in one direction or the other according as said relative movement of the elements is effected in one direction in opposition to a load, or in the other direction by the load; a movably mounted pawl adapted to co-act with said balls; and means yieldingly uging said pawl to an active position wherein said pawl will prevent circulation of the balls in one direction.

12. In mechanism of the class described, two elements, one of which is adapted to be driven for co-action with the other in moving a load; a series of balls ; means defining a continuous race between said elements receiving said balls to operatively connect the elements for relative movement through the medium of the balls which are forced to circulate in one direction or the other according as said relative movement of the elements is effected in one direction in opposition to a load, or in the other direction by the load; a movably mounted pawl adaptd to co-act with said balls; and means yieldingly urging said pawl to an active position wherein said pawl will retard circulation of the balls in said other direction to a predetermined extent, yet render the balls relatively free to circulate in said one direction.

THEODORE W. VICKERS.

REFERENCES CITED

The following references are of record in the file of this patent:

UNITED STATES PATENTS

| Number | Name | Date |
| --- | --- | --- |
| 611,832 | Coughlan | Oct. 4, 1898 |